United States Patent [19]

Johnston

[11] 4,340,474
[45] Jul. 20, 1982

[54] CONVERGING FLOW FILTER

[76] Inventor: Ian R. W. Johnston, 8 Kennedy St., Glenroy, Victoria, Australia

[21] Appl. No.: 190,231

[22] Filed: Sep. 24, 1980

[30] Foreign Application Priority Data

Sep. 29, 1979 [GB] United Kingdom ............ 7933861

[51] Int. Cl.³ .......................................... B01D 46/12
[52] U.S. Cl. ............................... 210/199; 210/311; 210/335; 55/443; 55/488; 55/DIG. 14
[58] Field of Search ............ 210/199, 201, 203, 209, 210/299–301, 310, 311, 314, 315, 334, 335, 342, 346, 347, 487–490; 55/350, 418, 442, 443, 461, 440, 488, 521, DIG. 14

[56] References Cited

U.S. PATENT DOCUMENTS

| 3,515,280 | 6/1970 | Porker | 210/314 |
| 3,561,196 | 2/1971 | Westlin | 55/443 X |
| 3,725,271 | 4/1973 | Giannotti | 55/DIG. 14 |
| 3,732,075 | 8/1973 | Acaba | 55/443 X |
| 4,115,278 | 9/1978 | Fritsch | 210/488 |
| 4,123,241 | 10/1978 | Maden | 55/442 |

FOREIGN PATENT DOCUMENTS 388627 3/1933 United Kingdom .
388637 3/1933 United Kingdom .
1101062 1/1968 United Kingdom .
1377453 12/1974 United Kingdom .
1544202 4/1979 United Kingdom .

Primary Examiner—Thomas G. Wyse
Attorney, Agent, or Firm—Klarquist, Sparkman, Campbell, Leigh, Whinston & Dellett

[57] ABSTRACT

A low velocity converging flow filter for removing at least part of the solids content from a solids-bearing fluid or fluid mixture comprising a generally conically shaped housing the larger diameter end of which forms an inlet for the fluid or fluid mixture and the smaller diameter end of which an exit therefor, a plurality of spaced, annular segments of progressively decreasing diameter being mounted in the housing in a manner complementary to the conical shape of the housing, each segment including a lip or flange at the downstream end thereof to deflect solids striking same into the main fluid stream passing through the filter while permitting fluid to pass around the lip or flange into the spacing between adjacent segments for removal from the filter. The segments may be porous to allow injection of fluid into the fluid stream to enhance dilution of solids in the stream in the region of the lip or flange.

11 Claims, 3 Drawing Figures

CONVERGING FLOW FILTER

The present invention relates to a flow filter for separating out solids from a solids-bearing fluid or fluid mixture. The invention is applicable, but not exclusively, to the separation out of the solids content from the flue gases of a coal fired power station.

One of the difficulties with known flow filters for solids separation lies in the fact that they tend to introduce undesirable characteristics either into separated out solids or into the flow of the remaining fluid or fluids. For example, a cyclone tends to create helical spinning of the fluid or fluids, and in other filters solids tend to adhere by impact to the side of the filter vessel and/or block the filter element.

Earlier gas-solids filters of the cyclone type operate by momentum of the entrained particles. Therefore such filters have been run with high inlet velocities to gain a sufficient force field on the particle in the separation zone.

In a curved flow path the particle, if in steady motion, experiences a radially outward force (F) given by the expression $$F = m\omega^2 r \quad (a)$$

where m=particle mass, $\omega$=angular velocity of the particle in radians sec$^{-1}$ or $u_s/r$, r=radius of curvature at the moment considered, $u_s$=free stream velocity (average axial value).

Alternatively, for fine particles and ignoring the relative velocity between particle and conveying gas $$F = m u_s^2 / r \quad (b).$$

Now referring to expression (b) the force F varies as the square of $u_s$. For this reason high inlet velocities of 15-17 m s$^{-1}$ have been traditionally used to achieve effective separation of particles. However, the effects of turbulence which re-entrains separated particles or causes them to act in contrary manner to good separation has been largely ignored. Random turbulent eddies have also reduced the effectiveness of filtration.

According to the present invention there is provided a filter for solids-bearing fluid or fluid mixture including a substantially vertically disposed filter means adapted to receive said fluid into the larger diameter end of said filter and said filter including a plurality of spaced substantially annular elements each element including means to focus entrained solids in the fluid into the central mainstream flow of fluid through the filter and means to draw off clean fluid between said elements.

According to a further aspect of the present invention there is provided a filter for removing at least part of the solids content from a solids-bearing fluid or fluid mixture comprising a generally conically shaped housing the larger diameter end of which forms an inlet for the fluid or fluid mixture and the smaller diameter end of which an exit therefor, a plurality of spaced, annular segments of progressively decreasing diameter being mounted in the housing in a manner complementary to the conical shape of the housing, each segment including a lip or flange at the downstream end thereof to deflect solids striking same into the main fluid stream passing through the filter whilst permitting fluid to pass around the lip or flange into the spacing between adjacent segments for removal from the filter.

The fluid may be either a gas or a liquid but for convenience the preferred form of the invention is described in relation to gas.

The segments may be in the form of solid rings or alternatively and preferably the segments may be of porous solid material including plaster of paris, ceramic, metal or other fine grained material. If desired the material may be of moulded polymer or other organic compound. The choice of material is dependent upon the expected filtration duty, i.e. temperature, abrasive nature of materials whether the solid material is sticky, particle size range, concentration, monodisperse or polydisperse nature of solids, and whether consisting of mono or multiple minerals or compounds.

In one aspect of the invention the inner surfaces of the segment rings are kept porous while the outer surfaces are sealed off. Connected to the inner surfaces of the ring assembly is a fluid pressure manifold with ring connections sufficiently numerous to permit all rings to be injected. The path through which injected fluid flows is augmented with the ring mounting lugs which interconnect the individual rings to make up the cascade conical filter zone. When assembled in this way a light axial compressive force may be applied to the ring assembly or spring thrustors, the reaction from which is transmitted through the outer conical section.

The destination of injected fluid is into the main axially flowing two phase stream.

Depending on the material used the porous ring may be either monobloc or in two sections, a generally cylindrical portion to form an approach zone and a generally tapering diverging upwardly portion to form a filter zone. The latter portion includes, the inwardly conical or inwardly curved section comprising the said downstream lip or flange. In a preferred embodiment of the invention vanes are provided along at least part of the longitudinal axis of the filter to at least partly reduce any tendency to rotation of the gas or gases.

The fluid or fluid solids mixture may be admitted to the approach zone and filter zone from a coarse particle settlement chamber constructed integral with the approach inlet. This settlement chamber consists of a large contrafacing nozzle so that axial fluid reversal occurs at the inlet to the approach zone. This reversal enables coarse particles to separate out of the fluid-solids by momentum and to collect in a lower hopper for batch or continuous removal.

The approach section may also consist of an inner porous section, cylindrical in shape. The porous section is injected with fluid under pressure which mixes with the axially flowing two phase fluid solids mixture. The purpose of this approach section is to condition the flow profile as in the filtration zone pure carrier fluid is injected at pressure sufficiently high to produce the desired amount of inner surface injection. The means of introducing this injected fluid may be either by means of manifold means or by means of a concentric outer chamber enclosing the porous cylinder.

Deswirl vanes may be incorporated in this approach section to ensure true axial flow without yaw or swirl. The provision of such vanes may be necessary if any vortex flow exists at the filter intake.

The invention will now be described further by way of example with regard to the accompanying drawings in which.

Figure 1:
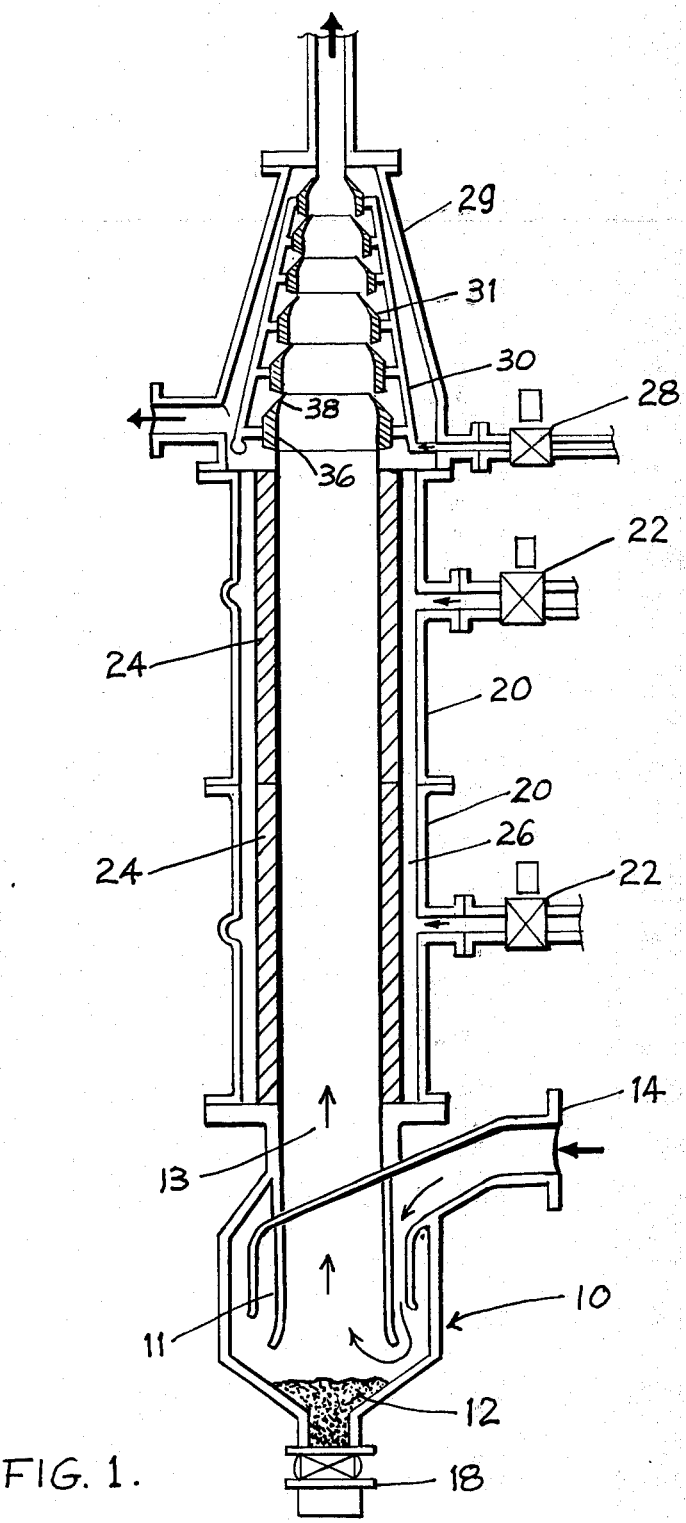
FIG. 1 is a vertical sectional view of a flow filter in accordance with a preferred embodiment of the present invention.

The flow filter illustrated in FIG. 1 is in columnnular form and consists of three connected sections. The base section is a hopper 10 providing a coarse settling chamber 12. The vessel includes a flanged, side inlet port 14 by way of which solids-bearing gases may be introduced into the hopper 10 directed downwardly through annular passage 11 and then upwardly into the approach zone 13 of the filter. A control valve 18 in the base of the hopper may be manually or automatically operated at selected times to enable coarse solids which have settled out from the gases introduced through the inlet port 14 to be removed.

The intermediate or approach section 13 consists of two outer cylinders 20 each of which has flanged ends. The cylinders 20 are connected together coaxially and the lower cylinder is connected to the flanged upper end of the hopper 10. Each cylinder 20 has a valve controlled side inlet 22 to enable pressurised gas or gases to be introduced or injected into the composite cylinder. A porous membrane 24 is arranged concentrically within the cylinders 20. The membrane is preferably sintered metal but may be of any suitable material such as porcelain loosely packed and fused. Satisfactory results have been achieved with apertured metal plate. A gas distribution chamber 26 is thus formed between the cylinder and membrane which chamber permits gas introduced through the inlets 22 to be distributed around the external surface of the membrane 24. The gas is then injected through the membrane in a substantially uniform, radially-inwardly pattern distributed along the whole length of the membranes 24. It has been found that satisfactory injection occurs with gas pressure of the order of 25 kPa (¼ atmosphere).

The injected gas may be air or an air mixture or could be the same gas or gas mixture as that carrying the solids through the filter. The function of the injected gas is to constrict the solids content of gases flowing through the filter to a core region corresponding substantially with the longitudinal axis of the filter. It will be appreciated that an added advantage of the injected gas is to keep the walls of the membrane substantially free from collisions by the solids content of the gas.

Figure 2:
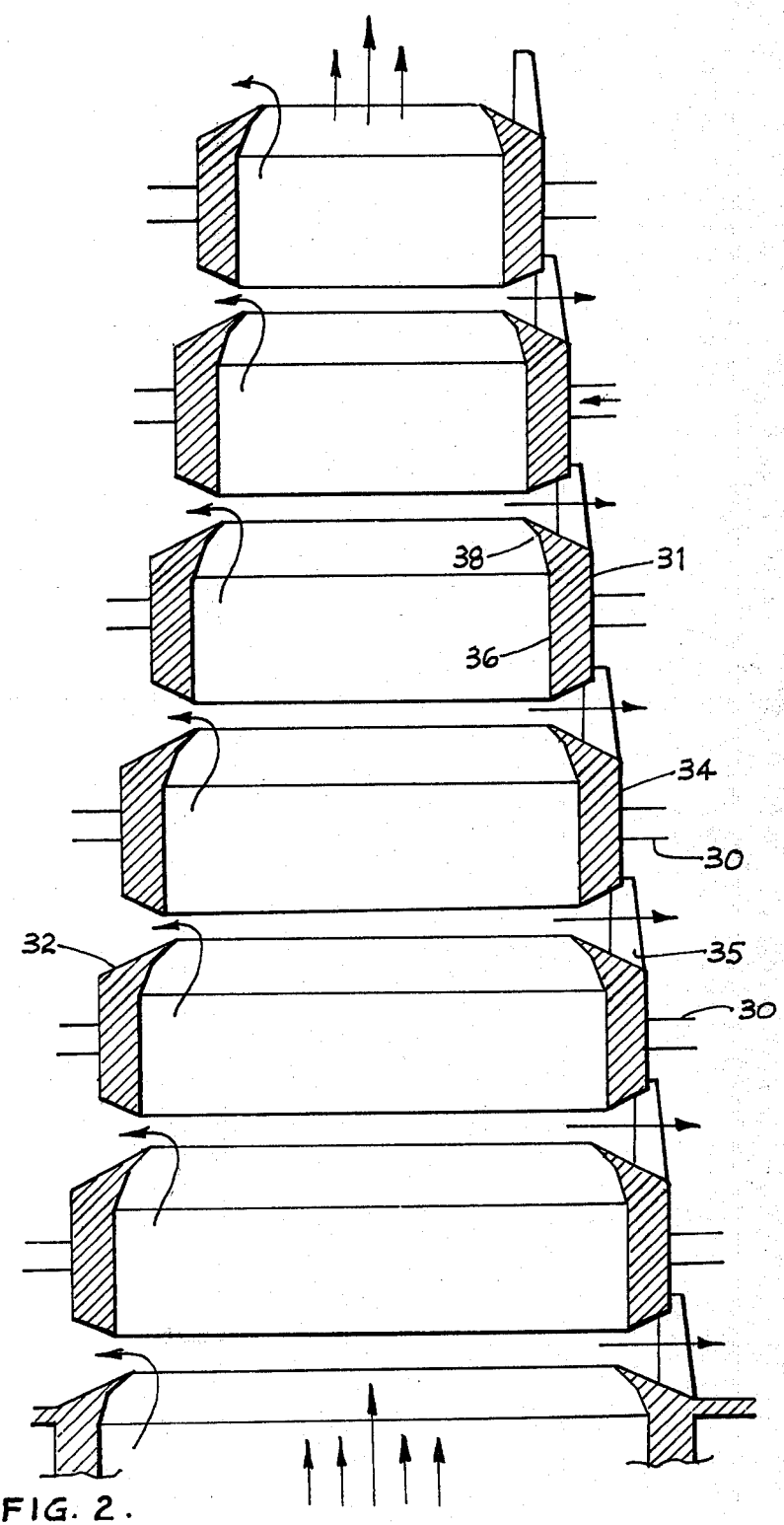
FIG. 2 is an enlarged view of part of the converging flow chamber of the filter shown in FIG. 1.

The top or converging zone of the filter consists of a generally conically shaped outer cowl 29 which is flanged and secured to the corresponding flange of the top cylinder 20. A valve-controller port 28 enables gas or a gas mixture to be introduced in a controlled manner into a manifold 30 which injects the gas into a plurality of segments 31 each of which is shown generally at FIG. 2. Each segment is annular and of apertured or porous material such as apertured plate, sintered metal or porous fused ceramic. The segments are spaced apart and supported on mounting lugs 35 which interconnect the individual segments. Satisfactory test results have been achieved with silica chrome cobalt moulding powder used in investment mould casting techniques and sometimes known as crushed opal powder. A porous and strong structure is obtained simply by mixing the powder in water.

The outer surface 34 of each segment is preferably rendered impervious by occluding the surface with a hardening and setting material to achieve unidirectional inward flow of injected gas. The hardening and setting material may be of an epoxy resin where the filter is to be used under ambient conditions or silicone resin and an inert metal where the filter is to be used under hot gas conditions. In any event the occlusion process is performed after the manifold pipes 30 have been secured, for example, by bonding to the segments.

The inner surface of the segments are in two parts, the first being a plain cylinder 36 which leads into the second part which is in the form of a truncated cone or hemisphere 38. The truncated portion subtends to an angle of between 35° and 45°, the actual angle being governed by the material to be filtered. The truncated part of the segment, has its top face 32 chamfered to provide a diverging path for the cleaned gas stream flowing through the spacing, the solids entrained in the central gas stream is carried past the spacings between adjacent segments under its own momentum. Hence, that portion of the solids introduced from the intermediate section to the converging section may be thought of as being focused towards the longitudinal axis of the section, the gaseous portion of the mixture being maintained displaced from the porous sections by fluid injected therethrough. The porous sections are so placed as to give the gaseous mixture as uniform a velocity as possible along the various sections used. If desired a plurality of spaced radial vanes (not shown) may be provided extending axially in the converging section to prevent rotation of the gas therein to enhance the focusing effect upon the entrained solids.

The gas flow through the filter is maintained at substantially constant velocity sufficient to maintain particles entrained in the air stream. The pressure is also maintained substantially constant whilst the volume of gas is reduced as the fluid travels up the filter by clean fluid on the outer perimeter of the fluid stream being drawn off through the spacings between adjacent segments. The accompanying table shows some comparative test results between the filter of the present invention and a conventional cyclone type filter.

The air flow rate represents the rate of flow of fluid through each filter.

The pressure drop is the drop in pressure measured in millimeter of water between the inlet and clean air outlet.

The mass efficiency is the percentage of mass of solids removed from the fluid against the total mass of solids at the input to the filter.

The inlet and outlet concentration represents the particle concentration in the fluid at inlet and outlet.

The median mass of the particles represents average particle size in microns.

| Collector Type + Ref | Particle Material | Air Flow Rate m³min⁻¹ | Pressure Drop mmwg | Mass Effic'y % | Inlet Particle Concent'n g m⁻³ | Outlet Particle Concent'n g m⁻³ | Inlet Particle Mass Median Diam (Stokes) μm (micron) | Outlet Particle Mass Median Diam (Stokes) μm |
|---|---|---|---|---|---|---|---|---|
| Achieved performance of inertial dust collectors with ambient transporting air. | | | | | | | | |
| Cyclone (1) AStern AP V111P406 | sand & gravel | 48.1 | 101 | 50 | 13 | N/A | 5.3 | 1.8 |
| Cyclone (2) | sand & gravel | 348 | 48 | 87 | 504 | N/A | 8.2 | 3.2 |
| Converging Flow Filter C.F.F.1. | milled quartz | 33 | 23 | 78 | 4 | 0.4 | 29 | N/A |
| Converging Flow Filter C.F.F.2. | milled quartz | 40 | 36 | 84 | 13 | 1.9 | 24 | 14 |
| Converging Flow Filter C.F.F.3. | milled quartz | 51 | 74 | 79 | 8 | 1.1 | 20 | 18 |

The construction of the converging flow filter used to achieve the test results in the table was simplified by using spaced plates rather than porous moulded materials and it is expected that even better results will be achieved with porous moulded materials as herein described.

The mass efficiency figures achieved are comparable with conventional cyclones being much better than cyclone 1 and slightly worse than cyclone 2. These results are achieved with relatively low fluid flow rates and pressure drops.

After leaving the filter the solids containing portion of the gas may be passed to a further stage or alternatively to a known cyclone for further treatment and then released to atmosphere. In the alternative, part of the treated gases may be recycled and used to pressurise the intermediate section.

Various modifications are possible within the scope of the invention for example the spaced segments may include a cylindrical section with an inwardly and upwardly directed lip made from solid sheet useful for focusing the entrained solids.

In addition, whereas the converging section of the filter has been described with a coarse settling chamber and an intermediate or approach section, the converging section may be used alone or with the coarse settling chamber only, or with the approach section only.

Figure 3:
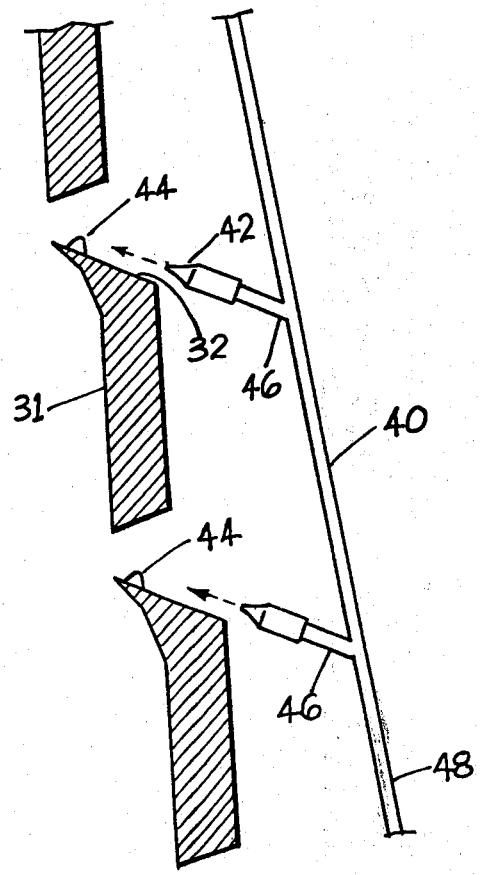
FIG. 3 is a view showing a blast jet cleaning system.

Another modification within the scope of the invention is to include a blast jet system 40 for periodical cleaning of accumulated solids on the top face 32. In this arrangement shown in FIG. 3, the blast jets 42 are equipped with fan tip nozzles to encompass the portion of ring deposit 44 on top face 32. The number of small bore semi-axial pipes 46 needed to fix the nozzles in sufficient numbers to encompass the deposit is approximately six. These are interconnected to a convenient single or multiple ring main 48 itself connected by a valve or valves to the pressurised gas source. Operation of the said valve or valves may be manually or an automatic cycle.

This invention permits the use of much lower inlet velocities than does earlier known filters e.g. cyclones. The effectiveness of the converging flow filter according to the invention is partly dependent upon the establishment of a more ordered (less random) flow regime in the region of separation i.e. in the converging flow region. Turbulence is also de-intensified by operating at lower average axial velocities. The converging flow filter will operate at low axial velocities (i.e. around 2–4 m/s where the intensity of free stream turbulence is radially reduced compared with the cyclone. In fact the cyclone depends upon high velocities for its efficient operation as compared with the present filter. Therefore the cyclone has a relatively high energy consumption compared with the filter of the present invention.

I claim:

1. A filter for solids-bearing fluid including a filter means adapted to receive the fluid into the larger diameter end of the filter, the filter including a plurality of spaced, substantially annular, porous segments, each segment including means to focus entrained solids in the fluid into the central mainstream flow of fluid through the filter and means to draw off clean fluid between said segments, said focusing means including means for injecting fluid through said segments into the fluid stream.

2. A filter as claimed in claim 1 wherein said filter means is substantially vertically disposed and said annular segments are positioned to form an upwardly converging core space and each segment includes an inwardly directed lip at the downstream end thereof.

3. The filter of claim 1 wherein each of said segments includes a substantially cylindrical portion at its upstream end and a lip at the downstream end thereof, said lip acting to deflect solids striking same into the fluid stream.

4. A filter for removing at least part of the solids content from a solids-bearing fluid or fluid mixture comprising a generally conically shaped housing the larger diameter end of which forms an inlet for the fluid or fluid mixture and the smaller diameter end of which an exit therefor, a plurality of spaced, annular segments of progressively decreasing diameter being mounted in said housing in a manner complementary to the conical shape of said housing, each segment including a lip at the downstream end thereof to deflect solids striking same into the main fluid stream passing through the filter whilst permitting fluid to pass around said lip into the spacing between adjacent segments for removal from the filter, said segments being of porous material to enable injection of fluid through said segments and into the main fluid stream.

5. A filter for removing at least part of the solids content from a solids-bearing fluid or fluid mixture comprising a generally conically shaped housing, the larger diameter end of which forms an inlet for the fluid or fluid mixture and the smaller diameter end of which an exit therefor, a plurality of spaced, annular segments of progressively decreasing diameter being mounted in said housing in a manner complementary to the conical shape of said housing, each segment including a lip at the downstream end thereof to deflect solids striking same into the main fluid stream passing through the filter whilst permitting fluid to pass around said lip into the spacing between adjacent segments for removal from the filter, and including a substantially porous cylindrical section connected upstream of said conical housing, said cylindrical section including a settlement chamber to collect coarse particles prior to them entering said cylindrical section, said cylindrical section including means for injecting fluid through said porous section into the fluid stream.

6. A filter for removing at least part of the solids content from a solids-bearing fluid mixture comprising a generally conically shaped housing adapted to be mounted substantially vertically, a plurality of spaced, annular segments of progressively decreasing diameter being mounted substantially vertically in series in said housing in a manner complementary to the conical shape of said housing to form a fluid flow path extending from the larger diameter segments to the smaller diameter segments, each segment including a substantially cylindrical portion at its upstream end and a lip at the downstream end thereof, said lip acting to deflect solids striking same into the main fluid stream passing through the filter whilst permitting substantially clean fluid to pass around said lip into the spacing between adjacent segments for removal from the filter.

7. A filter as claimed in claim 6, wherein said segments are composed of porous material to enable injection of fluid through said segments into the fluid path.

8. A filter as claimed in claim 6, wherein a lateral outlet is provided in said conical housing through which filtered fluid is drawn from fluid passing around said lip of each segment.

9. A filter for removing at least part of the solids content from a solids-bearing fluid mixture comprising a generally conically shaped housing adapted to be mounted substantially vertically, a plurality of spaced, annular segments of progressively decreasing diameter being mounted substantially vertically in series in said housing in a manner complementary to the conical shape of said housing to form a flow path for fluid extending from the larger diameter segments to the smaller diameter segments, wherein said segments are composed of porous material to enable injection of fluid through said segments into the fluid stream, substantially solids-free fluid being permitted to pass between said spaced segments for removal from said housing.

10. A filter as claimed in claim 6 or 9, further including a substantially porous fibrous cylindrical section connected upstream of said annular segments, said cylindrical section including a settlement chamber to collect coarse particles prior to them entering said cylindrical section, said cylindrical section including means for injecting fluid through said porous section into the fluid stream.

11. A filter as claimed in claim 6 or 9 comprising an outlet axially aligned with the fluid path through said segments and located adjacent to the segment of smallest diameter through which the longitudinal core section of the fluid stream is drawn.

* * * * *